United States Patent
Voth

(10) Patent No.: US 8,752,693 B2
(45) Date of Patent: Jun. 17, 2014

(54) CONTAINER TRANSPORTING DEVICE

(75) Inventor: Klaus Voth, Obertraubling (DE)

(73) Assignee: Krones AG, Neutraubling (DE)

( * ) Notice: Subject to any disclaimer, the term of this patent is extended or adjusted under 35 U.S.C. 154(b) by 658 days.

(21) Appl. No.: 12/971,136

(22) Filed: Dec. 17, 2010

(65) Prior Publication Data
US 2011/0147169 A1     Jun. 23, 2011

(30) Foreign Application Priority Data
Dec. 23, 2009 (DE) .......................... 10 2009 055 301

(51) Int. Cl.
*B65G 47/00* (2006.01)
*B65G 47/84* (2006.01)

(52) U.S. Cl.
CPC .................................... *B65G 47/848* (2013.01)
USPC ....................................................... 198/471.1

(58) Field of Classification Search
USPC .............................................. 198/471.1, 788
See application file for complete search history.

(56) References Cited

U.S. PATENT DOCUMENTS

| | | | | |
|---|---|---|---|---|
| 2,132,707 A * | 10/1938 | Smith | ........................... | 43/132.1 |
| 4,084,686 A * | 4/1978 | Calhoun | .................... | 198/464.4 |
| 4,837,493 A * | 6/1989 | Maeno et al. | .................. | 318/685 |
| 4,853,567 A * | 8/1989 | Muramatsu et al. | ........ | 310/67 R |
| 6,244,427 B1 * | 6/2001 | Syverson | ...................... | 198/788 |
| 7,497,323 B2 * | 3/2009 | Davidson et al. | .......... | 198/474.1 |
| 8,047,357 B2 * | 11/2011 | Braun et al. | ............... | 198/860.1 |
| 2007/0035197 A1 | 2/2007 | Usui | | |
| 2010/0037988 A1 | 2/2010 | Wilhelm et al. | | |

FOREIGN PATENT DOCUMENTS

| | | |
|---|---|---|
| CN | 1913303 A | 2/2007 |
| DE | 20203781 U1 | 7/2003 |
| DE | 102006039090 A1 | 2/2008 |
| DE | 102007017925 A1 | 10/2008 |
| DE | 102008010894 A1 | 8/2009 |
| DE | 102008010895 A1 | 8/2009 |
| DE | 102008038146 A1 | 2/2010 |
| EP | 1342678 A1 | 9/2003 |
| EP | 1647518 A1 | 4/2006 |
| EP | 1751008 A2 | 2/2007 |
| WO | WO-2008145363 A1 | 12/2008 |

OTHER PUBLICATIONS

European Search Report for 10188369.2, dated Apr. 11, 2011.
Notification of First Office Action, The State Intellectual Property Office of the People's Republic of China, Application No. 201010620280.8, dated Sep. 24, 2012.
German Search Report for DE 102009055301.0 dated Nov. 3, 2010.

(Continued)

*Primary Examiner* — William R Harp
(74) *Attorney, Agent, or Firm* — Marshall, Gerstein & Borun LLP

(57) ABSTRACT

A container transporting device having a centrally rotatingly driven star wheel including a plurality of elements for manipulating containers, a stationary column and an electric motor which forms a drive unit of the container transporting device and comprises a stator and a rotor, and the stator of which is supported relative to the column, the electric motor is an outer-rotor motor the stator of which is detachably mounted on the column, and the rotor of which carries the star wheel equipped with the elements and supports it via the stator on the column.

4 Claims, 2 Drawing Sheets

(56) References Cited

OTHER PUBLICATIONS http://www.wasserlust24de/torqeedo_elektroaussenborder.htm, Dec. 14, 2010.
www.cytecsystems.de, Dec. 14, 2010.
Notification of the Second Office Action, The State Intellectual Property Office of the People's Republic of China, Application No. 201010620280.8, dated Apr. 15, 2013.
Notification of the Third Office Action, The State Intellectual Property Office of the People's Republic of China, Application No. 201010620280.8 dated Sep. 29, 2013.

* cited by examiner

CONTAINER TRANSPORTING DEVICE

CROSS-REFERENCE TO RELATED APPLICATION

The present application claims the benefit of priority of German Application No. 102009055301.0, filed Dec. 23, 2009. The entire text of the priority application is incorporated herein by reference in its entirety.

FIELD OF THE DISCLOSURE

The present disclosure refers to a container transporting device of the type used in bottling operations.

BACKGROUND

In a generic container transporting device according to DE 10 2008 010 895 A, a cup-shaped motor housing with a diameter substantially corresponding to the diameter of the basic body of the cylindrical column is sealingly mounted on the upper end of the column. In the motor housing, the hollow-cylindrical stator of the inner-rotor electric motor is fixed, for instance by being pressed in. In the stator the cylindrical rotor is seated on a shaft from which a shaft journal projects upwards to protrude freely from the motor housing, and carries the star wheel. The motor housing comprises two bearing brackets in which bearings (loose bearing and fixed bearing) carry the rotor shaft and support and center the axial load of the star wheel. A motor controller is accommodated in a separate sealed compartment of the motor housing into which connection cables pass from the column. The motor housing that contains the stator and the rotor can be subjected to overpressure. In the penetration area of the shaft journal a rotary seal is arranged in a cover plate of the motor housing. It is complicated to exchange the electric motor, components thereof, or the star wheel, above all for the reason that access is limited and must be manipulated on many fastening elements and structural components. The rotary seal that is positioned at an exposed place is prone to leakage. The column and the motor housing are complicated components and difficult to mount. Since one wishes to keep the outer diameter of the basic body of the column as small as possible, the magnetic rotary force between the stator and the inner type rotor acts on a relatively small diameter, which inexpediently restricts the torque output of the electric motor.

It is known from EP 1 751 008 A that a plurality of elements for manipulating a plurality of containers, each in the form of a turntable for a container, are supported on a conveying table which is rotatingly or linearly driven in the conventional way, and each turntable is rotated hack and forth for the rotational alignment of the container around the turntable axis. An outer-rotor motor which is only cyclically driven for the rotational alignment in the one or the other rotational direction is provided as a drive unit of each turntable. The rotor of the motor is configured as a housing that can form the turntable at the same time, and it is rotatably supported on the conveying table with a separate rotary bearing while bypassing the stator. The stator contains windings and is fixed onto the conveying table.

A transportation star which is only schematically disclosed in WO 2008/145363 A, also for use in the wet area of a cleaning machine, comprises an electric-motor direct drive between the column and the star wheel. A motor housing simultaneously forms the drive housing. The electric motor is a reluctance motor or a grooveless synchronous motor having a disk-shaped rotor that is placed axially above and partly covers the disk-shaped stator. The stator has arranged therein magnetic coils on a flat iron ring that is separated from the rotor of circular disk shape with soft magnetic iron planks by an air gap so that a frictionless relative rotation should be possible.

SUMMARY OF THE DISCLOSURE

It is an aspect of the present disclosure to improve a container transporting device of the aforementioned type such that despite a high performance the device has a simple design and comprises a drive portion that can be disassembled rapidly and conveniently. It is a part of the aspect to design the container transporting device in such a manner that the device can be used without any problems in a wet area which is critical even with respect to sepsis, and it is even then that ease of access is given for the rapid exchange of the drive motor or the components thereof.

The detachable connection of the stator with the column can be designed to be constructionally simple and above all with ease of access, inter alia due to the type of construction of the outer-rotor motor, so that an exchange is possible in a comfortable and rapid way (short downtime of the container transporting device). The star wheel is mounted on the rotor on an optimally large outer diameter increasing the stability of the star wheel support. The torque output of the outer-rotor motor is higher for a given constructional size than in the case of an inner-rotor motor for the reason that the magnetic thrust force between the stator and the outer type rotor acts on a larger diameter. This permits a very compact size of the outer-rotor motor and thus also a desirably lean column. Furthermore, the construction of the outer-rotor motor provides for a liquid-tight encapsulation, so that the container transporting device can be used even in wet areas, e.g. of cleaning machines, and even in cases where critical demands must be satisfied in the wet area with respect to sepsis.

In an expedient embodiment the outer-rotor motor is integrated as a direct drive unit, preferably detachably, either fully in a constructional way into the star wheel or it is attached thereto. This yields a stable support of the star wheel and compact dimensions in the vertical direction of the container transporting device.

Particularly expediently, a torque motor, preferably even a torque motor encapsulated in a liquid-tight manner, is used as the outer-rotor motor. Such torque motors are commercially available at low costs in the most different specifications and sizes and are distinguished by a high torque output, a liquid-tight encapsulation, if necessary, and a very precise controllability. Furthermore, torque motors have a great holding torque, they can be operated with a smooth run without any noticeable cogging, and even extremely small constructional sizes provide for surprisingly high performances. As a rule, a synchronous motor with permanent magnet excitation is here concerned, which motor can be controlled in a neat electronic way and produces a very high torque while the design is extremely compact and is encapsulated in a liquid-tight manner and is maintenance-free.

In an expedient embodiment the column is equipped on a hollow basic body with a shaft journal protruding on the upper side, onto which the stator is fixed directly or by means of at least one mechanically or hydraulically operable clamping set. Such mechanically or hydraulically operable clamping sets are known and commercially available. Their clamping seat is set or released by means of screws or hydraulically, whereby they offer advantageous fastening options for the stator and are mountable on the shaft journal in a space-saving way. After the clamping seat has been released, the outer-rotor motor with the star wheel can be removed conveniently from the shaft journal, while good access is guaranteed for the release and later fixation of the clamping set.

In an expedient embodiment, supply and/or control lines are passed through the shaft journal into the stator of the outer-rotor motor, the control lines being thereby protected against external influences even if the container transporting device is used in a wet area.

Particularly expediently, a motor controller is accommodated in the outer-rotor motor, preferably in the stator, with a power cable and at least one signaling cable being preferably laid through the shaft journal and leading to the controller. When the outer-rotor motor with the star wheel is removed, the cables can either be pulled out as well or they may be detached from simple plug connectors.

In a simple embodiment the stator is configured to be hollow-cylindrical and is directly attached on the outside to the shaft journal and fixed thereto, preferably with a fit, a pressing and/or with rotational and/or axial fastening elements.

In another embodiment the generally annular clamping set is detachably fixed to the shaft journal, and the stator is carried by the clamping set. After the clamping set has been detached (in a mechanically detachable or hydraulically detachable way), the outer-rotor motor can be easily removed, optionally together with the star wheel and the elements mounted thereon.

To be able to remove only the star wheel, if necessary, or to exchange the outer-rotor motor rapidly and conveniently, it may be expedient that the star wheel is fixed to the rotor in a form-fit and/or force-fit, preferably detachable, way. Screw joints may here be used or, like in the case of the stator, at least one mechanically or hydraulically operable clamping set.

To prevent the ingress of liquids in the upper region, if necessary, it may be expedient when the rotor comprises a central cap that can be removed in case of need.

Finally, it is expedient when the outer diameter of the outer-rotor motor is greater than the outer diameter of the basic body of the column of the container transporting device. This permits a very lean construction of the column, which must be regarded as expedient in terms of constructional space and cleaning (the column may even have a torpedo-like design, which is advantageous under cleaning aspects).

In essence, in contrast to the standard drive concept of such container transporting devices or transporting stars with an inner-rotor electric motor and a shaft journal of the rotor carrying the star wheel, the disclosure consists in integrating an outer-rotor motor, particularly a torque motor, in such a manner that an exchange can be carried out rapidly and conveniently with ease of access, the construction of the outer-rotor motor permitting the complete liquid-tight encapsulation thereof, so that the container transporting device can also he used in a wet area.

BRIEF DESCRIPTION OF THE DRAWINGS

Embodiments of the subject matter of the disclosure are explained with reference to the drawings, in which.

DETAILED DESCRIPTION OF THE PREFERRED EMBODIMENT

Figure 1:
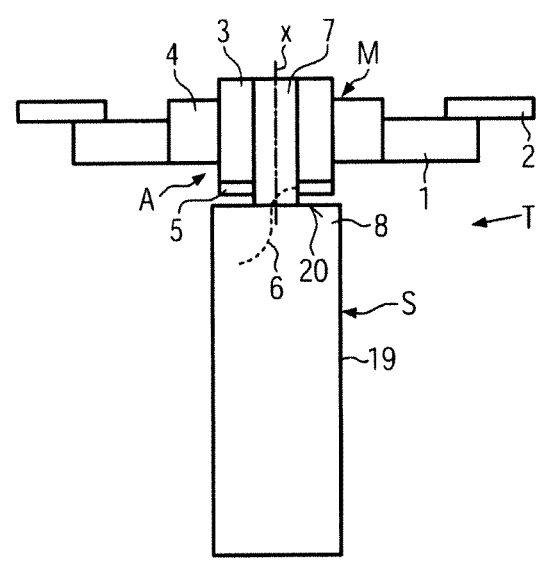
FIG. 1 is a schematic sectional illustration of a contain transporting device in a state ready for operation.

FIG. 1 is a schematic partial axial section showing a container transporting device T, as is used in container treating machines for transporting and positioning a plurality of containers (not shown) at the same time. A non-restrictive example of such a container treating machine is a bottle cleaning machine in which the container treating device T is used in a wet area in which critical operating conditions might prevail with respect to sepsis, and the container transporting device must be subjected to intensive cleaning cycles.

The container transporting device T comprises a column S that is standing on the ground either directly or with at least one standing foot or is fixed within a support frame (not shown) at some distance from and above the ground. The column S has e.g. a torpedo-like or generally cylindrical basic body 19 with a planar upper side 20, from which a shaft journal 7 projects e.g. centrally upwards and can define an axis of rotation X of the container transporting device T. The outer diameter of the shaft journal 7 is only a fraction of the outer diameter of the basic body 19.

The container transporting device T comprises a star wheel 1 on which elements 2, which are distributed on the outside in circumferential direction, are mounted for manipulating containers (transportation plane). The elements 2 may be tongs, grippers, turntables, or the like, and are rotatingly driven with the star wheel 1 about the axis X. The container transporting device T comprises a drive unit A with an electric motor in the form of an outer-rotor motor M. The drive unit A transmits the rotational movement to the star wheel 1 and supports the wheel on the column S. In the illustrated embodiment the outer-rotor motor M comprises a hollow-cylindrical stator 3 which is attached onto the shaft journal 7 and is detachably fixed thereto. The stator 3 is surrounded by an outer type rotor 4 of a hollow cylindrical configuration, optionally with a greater radial thickness than the radial thickness of the stator 3. The star wheel 1 is secured to the rotor 4, preferably also in a detachable manner. The outer-rotor motor M is expediently completely encapsulated and thus liquid-tight and can be removed from the shaft journal 7 with ease of access e.g. from the bottom side of the star wheel 1. A motor controller 5 may be integrated into the stator 3. At least one connection cable 6 (a cable for the drive speed signal and/or a power cable and/or a signaling cable) may be laid from the interior of the basic body 19 of the column S through the shaft journal to the motor controller 5 and into the stator 3, respectively.

Figure 2:
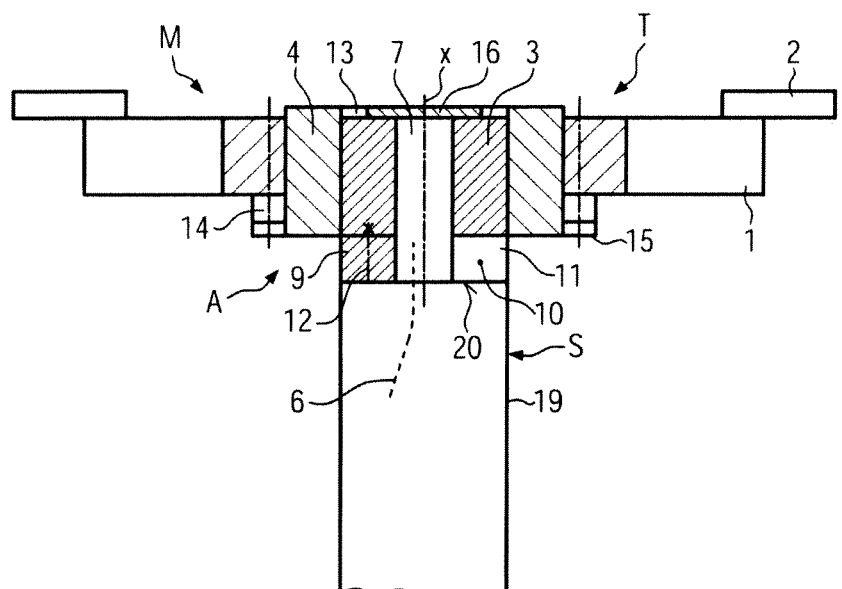
FIG. 2 is a partial axial section of a further embodiment.

In the embodiment of the container transporting device T in FIG. 2, the shaft journal 7 extends on the basic body 19 of the column S up to the upper end of the stator 3 which has a hollow-cylindrical configuration and pertains to the outer-rotor motor M. The stator 3 is attached, for instance by way of a sliding fit, onto the shaft journal 7 and is fixed with a clamping set 9. The clamping set 9 has, in general, the form of an annulus and can be clamped in place with clamping screws 10 in the area of at least one radial slot 11 onto the shaft journal 7. If necessary, the clamping set 9 comprises hydraulic elements that permit an easy detachment, or they can be used for unscrewing the clamping screws. The clamping set 9 can be supported on the upper side 20 of the basic body 19, but could also be clamped at any desired level onto the shaft journal 7 only. The stator 3 is detachably fixed to the clamping set 9, for instance by means of fastening elements 12, preferably from below. The rotor 4 which surrounds the stator 3 on the outside, which is rotatable relative to the stator and may be encapsulated, comprises e.g. an inwardly protruding annular flange 13 which defines an opening in which a cap 16 can be removably placed. The star wheel 1 is e.g. fixed to the outer circumference of the rotor 4, e.g. on an annular flange 1 at the bottom side and with fastening elements 15 that can be screwed in from below. Alternatively (not shown), the connection between the star wheel 1 and the rotor 4 could also be established with at least one clamping set similar to clamping set 9.

For manipulating and for preparing the removal of the star wheel 1 together with the outer-rotor motor M, free access is provided on the underside of the star wheel. Alternatively, the clamping set 9 could also be placed on the upper side of the stator 3 so that the star wheel 1 could be removed with the outer-rotor motor M from above. Connection cables 6 can be laid from the basic body 19 through the shaft journal 7 into the stator 3, optionally leading to the motor controller (not shown) arranged at said place.

Figure 3:
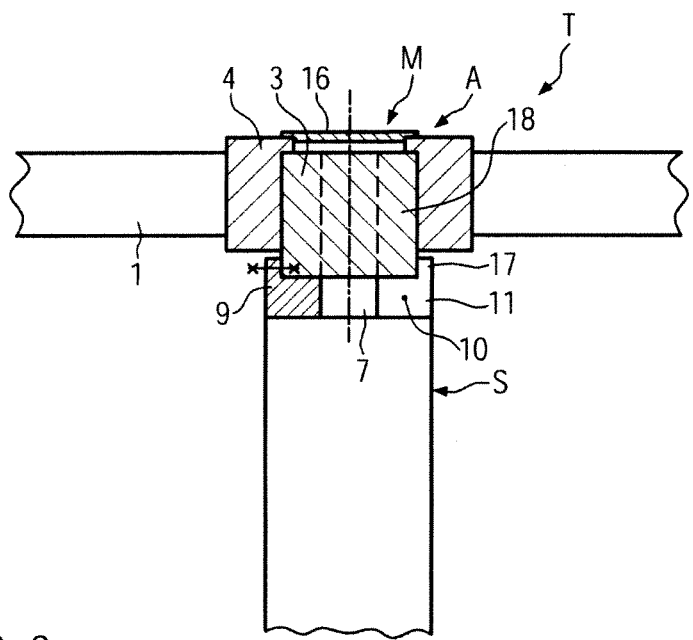
FIG. 3 is a partial axial section of a further embodiment.

In the embodiment in FIG. 3, the clamping set 9 (similar to the one in FIG. 2) comprises e.g. a ring mount 17 for fixing the stator 3. In this embodiment the stator 3 need not necessarily have a hollow cylindrical configuration. Moreover, the shaft journal 7 must only project upwards to such an extent as is needed for fixing the clamping set 9. This, however, shall not exclude a situation where a hollow cylindrical stator 3 is provided and where the shaft journal 7 is also allowed to project upwards to a greater extent than shown (as outlined in broken line at 18), if necessary for additionally centering the stator 3.

FIG. 3 does not illustrate in more detail the fastening of the star wheel 1 to the rotor 4, the center of which may be closed by the cap 16. The star wheel 1 could e.g. be pressed onto or fixed in any desired way to the rotor 4.

In further alternatives, the star wheel 1 is fixed either to the upper side or to the bottom side of the rotor 4, i.e. the outer-rotor motor M is constructionally integrated either directly into the star wheel or is attached thereto. The outer diameter of the basic body 19 of the column S can be smaller than the outer diameter of the outer-rotor motor M. On condition that it is adequately stable, the column S could even be formed continuously only with the diameter of the shaft journal 7, e.g. if the column S is fixed in a stable support frame extending underneath the transportation plane of the elements 2, optionally with free fields around the column S for the purpose of easy access and simple cleaning.

The invention claimed is:

1. A container transporting device, comprising:
a centrally rotatingly driven star wheel including exterior elements configured to manipulate a plurality of containers;
a stationary column having a hollow basic body, the hollow basic body comprising a shaft journal projecting from an upper side of the hollow basic body; and
an electric motor arranged as a drive unit of the star wheel, the electric motor being an outer-rotor motor including an inner cylindrical hollow stator and an outer cylindrical rotor co-axial with the cylindrical stator and surrounding an outer side of the hollow cylindrical stator, the hollow cylindrical stator being supported detachably relative to the stationary column and being fixed to an outer side of the shaft journal by means of at least one of a mechanically or hydraulically operable clamping annulus having at least one radial slot, the rotor being fixed with at least one radial and/or axial fastening element to the clamping annulus, and wherein the outer cylindrical rotor is configured to carry the star wheel and to support the star wheel via the hollow cylindrical stator on the hollow basic body of the stationary column.

2. The container transporting device according to claim 1, wherein the outer-rotor motor is a torque motor comprising a synchronous motor with permanent magnet excitation, and wherein the torque motor is encapsulated in a liquid-tight manner.

3. The container transporting device according to claim 1, wherein the stator of the outer-rotor motor accommodates a motor controller, and wherein a power cable and at least one signaling cable are laid through the shaft journal to the motor controller.

4. The container transporting device according to claim 1, wherein the outer diameter of the outer-rotor motor is greater than the outer diameter of the hollow basic body of the stationary column.

* * * * *